US011771228B2

(12) United States Patent
Chalfin et al.

(10) Patent No.: US 11,771,228 B2
(45) Date of Patent: *Oct. 3, 2023

(54) UNIVERSAL BACK OF CHAIR HANGER

(71) Applicant: SAMUELSON GROUP INC., Paterson, NJ (US)

(72) Inventors: Michael Adam Chalfin, Wayne, NJ (US); Michael Angelo Rinaldi, Bloomingdale, NJ (US); Lawrence Mark Chalfin, Wayne, NJ (US)

(73) Assignee: SAMUELSON GROUP INC, Paterson, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,242

(22) Filed: Oct. 28, 2021

(65) Prior Publication Data
US 2022/0211181 A1 Jul. 7, 2022

Related U.S. Application Data

(63) Continuation-in-part of application No. 17/365,238, filed on Jul. 1, 2021, which is a continuation of application No. 17/226,365, filed on Apr. 9, 2021, now Pat. No. 11,096,498.

(60) Provisional application No. 63/133,817, filed on Jan. 5, 2021.

(51) Int. Cl.
*A47C 7/62* (2006.01)
*B60R 7/10* (2006.01)
*A47G 25/06* (2006.01)
*A47G 29/00* (2006.01)
*A47C 7/64* (2006.01)

(52) U.S. Cl.
CPC .................. *A47C 7/62* (2013.01); *A47C 7/64* (2013.01); *A47G 25/0614* (2013.01); *A47G 29/00* (2013.01); *B60R 7/10* (2013.01)

(58) Field of Classification Search
CPC ........... A47C 7/64; B60R 7/10; A47F 5/0006; A47B 43/003; A47G 25/0614; A47G 25/0607
See application file for complete search history.

(56) References Cited

U.S. PATENT DOCUMENTS 2,582,650 A * 1/1952 Patton ...................... B60R 7/10
224/275
3,907,118 A * 9/1975 Pelavin .............. A47G 25/0614
224/927
(Continued)

FOREIGN PATENT DOCUMENTS

KR 20180094375 A * 8/2018

*Primary Examiner* — Timothy J Brindley
(74) *Attorney, Agent, or Firm* — Riverside Law LLP

(57) ABSTRACT

A chair hanger system includes a front plate, a back plate opposing the front plate, a plate separator defining a gap between the front plate and the back plate, and a first and second hook attached to the back plate. The first hook defines a first opening geometry and the second hook defines a second opening geometry. A set of spacer blocks includes a first spacer block configured to insert within the first opening to reduce and change the first opening geometry, and a second spacer block configured to insert within the second opening to reduce and change the second opening geometry. A chair hanger device is also described.

11 Claims, 14 Drawing Sheets

(56) References Cited

U.S. PATENT DOCUMENTS

| | | | | |
|---|---|---|---|---|
| 4,957,230 | A * | 9/1990 | Gonzales | B60R 7/10 224/927 |
| 5,058,790 | A * | 10/1991 | LaVelle | A47C 7/64 224/927 |
| 6,220,489 | B1 * | 4/2001 | Sato | B60R 7/043 224/927 |
| 2005/0188507 | A1 * | 9/2005 | Adams | A47G 25/0614 16/416 |
| 2009/0184077 | A1 * | 7/2009 | Curet | A45D 44/04 211/113 |
| 2019/0104874 | A1 * | 4/2019 | Baines | A47G 25/0614 |

* cited by examiner

UNIVERSAL BACK OF CHAIR HANGER

CROSS-REFERENCE TO RELATED APPLICATIONS

This application is a continuation-in-part of U.S. non-provisional application Ser. No. 17/365,238, filed Jul. 1, 2021, which is a continuation of U.S. non-provisional application Ser. No. 17/226,365, filed on Apr. 9, 2021, which claims priority to U.S. provisional application No. 63/133,817 filed on Jan. 5, 2021, all of which are incorporated herein by reference in their entireties.

BACKGROUND OF THE INVENTION

Walkers are mobility assistance devices commonly used by seniors, people with disabilities, those recovering from injury and others who may otherwise have arthritis, leg or hip weakness, balance problems and other types of mobility issues. Most walkers have a feature that allow it to fold or collapse when not in use to save space. For example, 3-sided rigid frame walkers typically allow the side panels to fold against the front panel, while other walkers may allow a collapsing fold that scrunches the walker into a small footprint.

Under many circumstances, the storage of walkers can become a safety issue. For example, at senior living facilities, where large numbers of the population rely on walkers, storage of walkers becomes an issue in common areas such as dining rooms. In some facilities, walkers are stored in a common area just off the main entrance. This leads to crowded walker storage areas, making it difficult to retrieve the walker when leaving. This also requires the user to walk unassisted to their table, or otherwise requires extra resources such as additional staff to assist the person to and from their table. In other facilities, walkers are stored in the dining area at or adjacent to the table. This gets the user closer to their chair with the walker and without staff assistance but causes crowding of walkers where dining takes place, causing an unsafe work environment for food service workers by obstructing their walking and serving lanes.

Thus, what is needed in the art is an improved device for storing walkers when not in use that allows users to keep their walker accessible, closer to their ultimate seating destination, while minimizing the walker as an obstruction for people that need to safely navigate the area where the walker is being stored.

SUMMARY OF THE INVENTION

In one embodiment, a chair hanger system includes a front plate, a back plate opposing the front plate, a plate separator defining a gap between the front plate and the back plate, and a first and second hook attached to the back plate, the first hook defining a first opening geometry and the second hook defining a second opening geometry, and a set of spacer blocks including a first spacer block configured to insert within the first opening to reduce and change the first opening geometry and a second spacer block configured to insert within the second opening to reduce and change the second opening geometry. In one embodiment, the gap includes a lower and an upper gap, wherein an interior surface of the front plate that at least partially defines the lower gap comprises a first concave radius of curvature opening away from the back plate and a sidewall portion angled towards the back plate, and wherein an interior surface of the plate separator that at least partially defines the lower gap comprises has a second concave radius of curvature opening away from the back plate and a sidewall portion angled towards the back plate. In one embodiment, a gap between the first and second concave radius of curvature increases moving away from center. In one embodiment, the upper gap is larger than the lower gap. In one embodiment, the back plate is tapered inward. In one embodiment, the back plate includes first and second connection elements, and a vertex of the first and second concave radius of curvature is positioned halfway between first and second connection elements.

In one embodiment, a chair hanger includes a front plate, a back plate opposing the front plate, a plate separator defining a lower and an upper gap between the front plate and the back plate, and multiple hooks attached to the back plate, wherein an interior surface of the front plate that at least partially defines the lower gap comprises a first concave radius of curvature opening away from the back plate and a sidewall portion angled towards the back plate, and wherein an interior surface of the plate separator that at least partially defines the lower gap comprises has a second concave radius of curvature opening away from the back plate and a sidewall portion angled towards the back plate. In one embodiment, a gap between the first and second concave radius of curvature increases moving away from center. In one embodiment, the upper gap is larger than the lower gap. In one embodiment, the back plate is tapered inward. In one embodiment, the back plate includes first and second connection elements, and a vertex of the first and second concave radius of curvature is positioned halfway between first and second connection elements.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION OF THE INVENTION

Figure 1A:
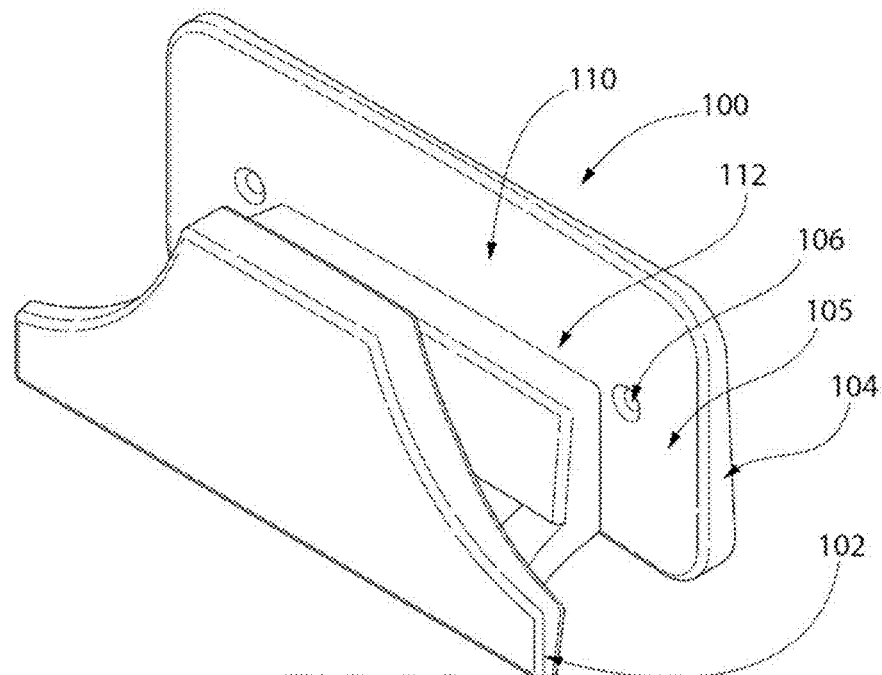
FIG. 1A is a perspective view of a hanger according to one embodiment.

It is to be understood that the figures and descriptions of the present invention have been simplified to illustrate elements that are relevant for a more clear comprehension of the present invention, while eliminating, for the purpose of clarity, many other elements found in chairs having integrated hangers. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a chair with integrated hanger.

Figure 1B:
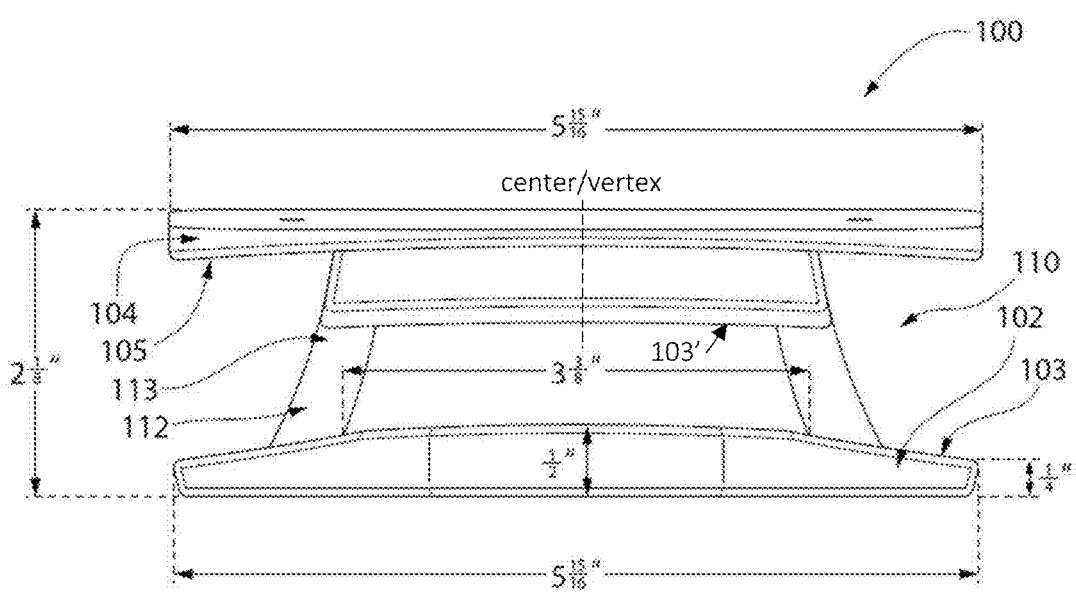
FIG. 1B is a top view.
Figure 1C:
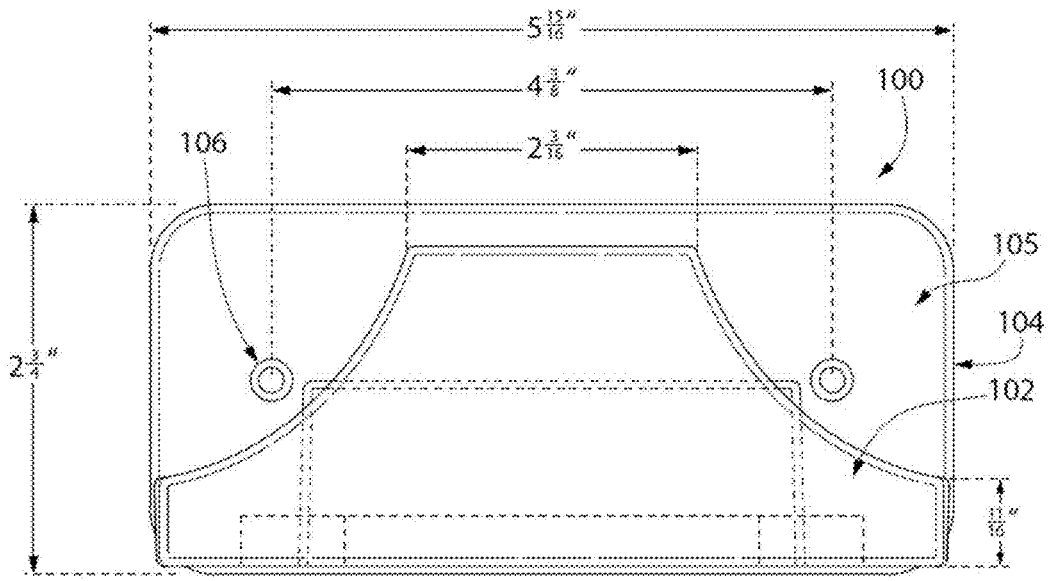
FIG. 1C is a front view and FIG. 1D is a side view of the embodiment of FIG. 1A.
Figure 1D:
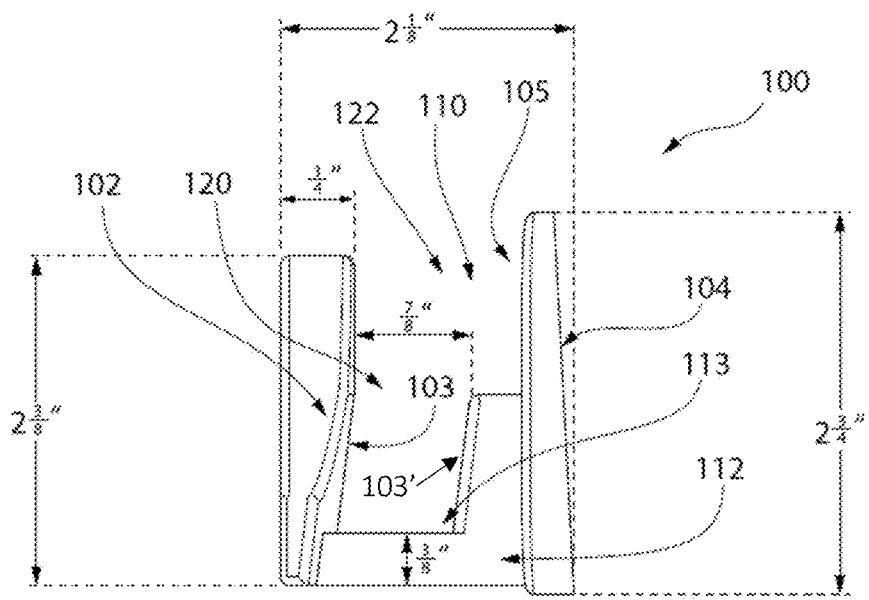

With reference now to FIGS. 1A-1D, a hanger 100 is shown according to one embodiment. The hanger 100 includes a front plate 102, a back plate 104 opposite the front plate 102 and configured for positioning against the back of a chair, and a gap 110 separating the front plate 102 and the back plate 104. The back plate 104 can include one or more openings 106 provided for fastening the hanger 100 to the back of a chair. With reference specifically to FIG. 1B, the geometry of the gap 110 is provided by an interior surface 103 of the front plate 102, a front surface 105 of the back plate 104, and a top surface 113 of a plate separator 112. With reference specifically to FIG. 1D, aspects of the hanger 100 geometry are shown which provide several advantages over conventional hanger designs. First, its noted that chairs conventionally have a back portion that's pitched or leans back slightly for the comfort of the user (see e.g. FIG. 2B and experimental examples, FIGS. 6A-6D). As shown in FIG. 1D, the back plate 104 tapers inward moving from the bottom to the top (a wider profile on bottom gradually tapering to a narrower profile at the top) to compensate for chair pitch. The proper walker hanging angle and secure fit is further provided by the front plate 102 interior surface 103 sidewall and adjacent plate separator 113 interior surface 103' sidewall which are both angled towards the back plate 104, providing a bottom gap opening 120 for wedging the hanger into a stationary and sway-resistant position. The wedge is provided in part by a curved interior surface 103 and 103' sidewalls having a curvature opening away from the back plate 104 and widening their separation (and the gap 110) as the curves move away from center. This provides a tighter wedge-type fit at center, balancing and stabilizing the walker on-center all while making walkers easy to load and retrieve by hand on either side of the hanger. Further, the top surface 113 of the plate separator 112 further provides a 2-step slot for the two conventional categories of walker bar profile sizes and geometries (circular and square), via the smaller gap 120 at the bottom for holding a conventional walker bar profile and the larger gap 122 at the top for holding non-conventional sizes, providing a single hanger 100 that can securely hold multiple sized walkers or some other second object atop a walker mounted below. Embodiments advantageously provide a proper angle for walkers to set in the hanger, tucked into the pitch of the chair back while maintaining a separation from the chair to avoid hitting or damaging the chair. This design also minimizes walker sway while mounted in the hanger, stabilizing the hanger while also making it easy for users to mount and retrieve. Dimensions shows are for illustrative purposes only according to one embodiment, and those having ordinary skill in the art will recognize that other dimension are possible without deviating from advantages of the embodiments described herein. Those having ordinary skill in the art will also recognize that advantages of the embodiments can be captured in a 2-piece hardware set. For example, the 2-step slot geometry shown in FIGS. 1A-1D can be provided by separate pieces of hardware, one having a single smaller gap (the lower gap) for holding a conventional walker bar profile and a second having a single larger gap (the upper gap) for holding non-conventional sizes and/or other objects. Accordingly, a 2-piece hardware set can be secured to a chair for holding multiple sized walkers (or a walker and some other second object) without deviating from advantages of the embodiments described herein. Those having ordinary skill in the art will also recognize that advantages of the embodiments can be captured in a 2-piece hardware set. For example, the 2-step slot geometry shown in FIGS. 1A-1D can be provided by separate pieces of hardware, one having a single smaller gap (the lower gap) for holding a conventional walker bar profile and a second having a single larger gap (the upper gap) for holding non-conventional sizes and/or other objects. Accordingly, a 2-piece hardware set can be secured to a chair for holding multiple sized walkers (or a walker and some other second object) without deviating from advantages of the embodiments described herein.

Figure 2A:
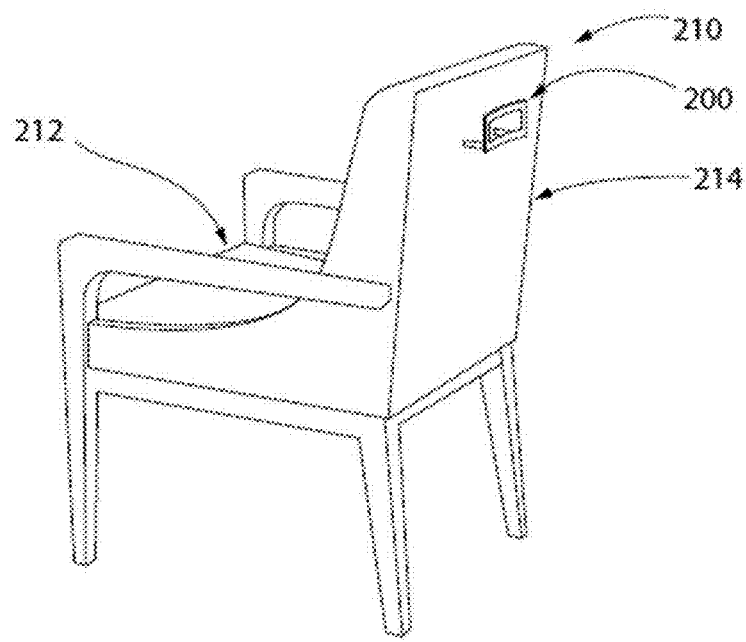
FIG. 2A is a perspective view of a chair with integrated hanger and FIG. 2B is an alternate perspective view according to one embodiment.
Figure 2B:
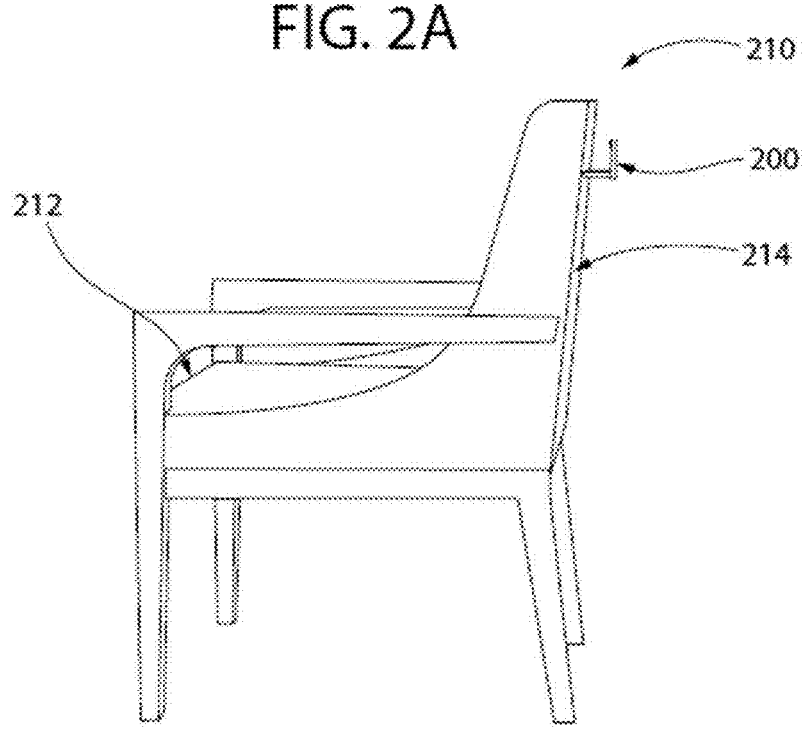
Figure 3A:
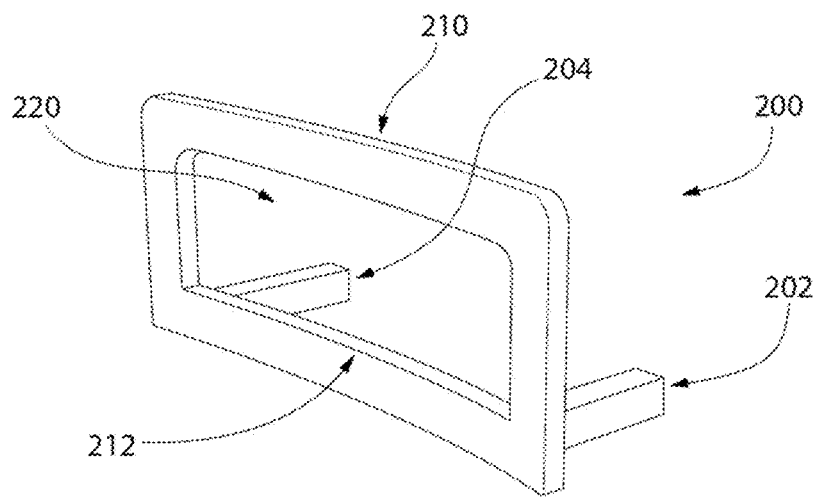
FIG. 3A is a perspective view of a hanger and FIG. 3B is an alternate perspective view according to one embodiment.
Figure 3B:
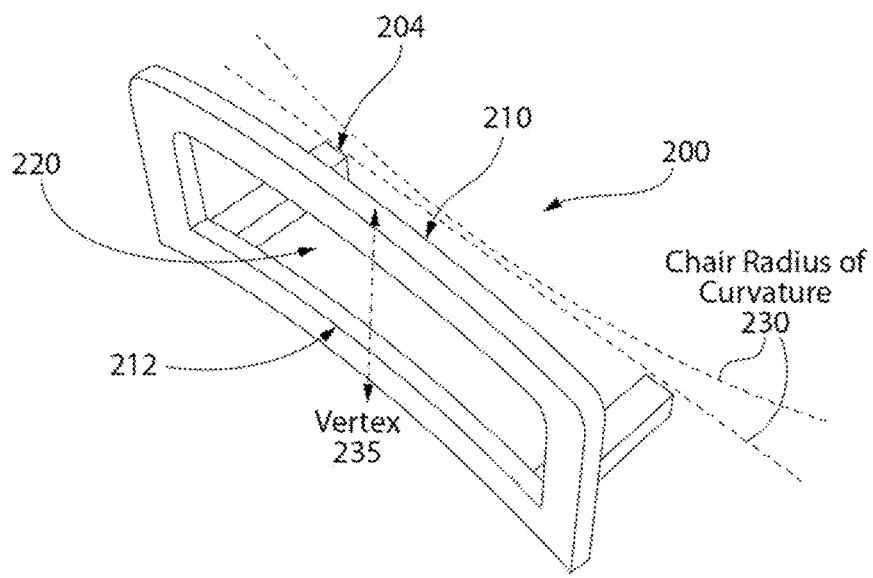

With reference now to FIGS. 2A and 2B, a chair 210 with integrated hanger is shown according to one embodiment. The chair 210 has a seating portion 212 connected to a back portion 214. Protruding from the back portion 214 is a hanger 200 integrated into the chair 210. Embodiments of the hanger 200 include a geometry and dimensions that facilitate safety. For example, with reference now to the hanger 200 shown isolated from the chair in FIGS. 3A and 3B, the separation between two chair connection points 202, 204 and a concave radius of curvature 210, 212 which can oppose a radius of curvature 230 of the chair back stabilize the walker when mounted while also allowing for easy access while mounting and dismounting. The opposing curvatures allow a snug fit for a variety of different walkers, while the chair radius of curvature is forgiving to allow a slight compression on the walker for stability. Specifically, a straight bracket will not allow a typical walker to hang without it tilting forward and hitting the chair since straight brackets might not necessarily fit the variable geometry of certain walkers. This interference between a straight bracket and variable walker geometry can cause the walker to rest against or bias against the chair, creating damage to the legs of the chair and possibly the walker. The angles and radius incorporated into the embodiments disclosed herein allow the walker to vary in size and shape but always hang straight vertically. The radius allows for center-point compression of the walker at the vertex of the radius for stability, all while the hanger structure gradually moves way from the walker (via the radius) away from the walker so that it does not interfere with the ability of the walker to hang straight down. The center-point compression of the walker at the vertex can be centered between the two connection points. Thus, the walker rests on the two connection points, held firmly in place at the vertex, minimizing the possibility of the walker damaging the chair legs since it hangs straight down and stable. An opening 220 can be included in the hanger 210 so that it also functions as a chair pull.

Figure 4A:
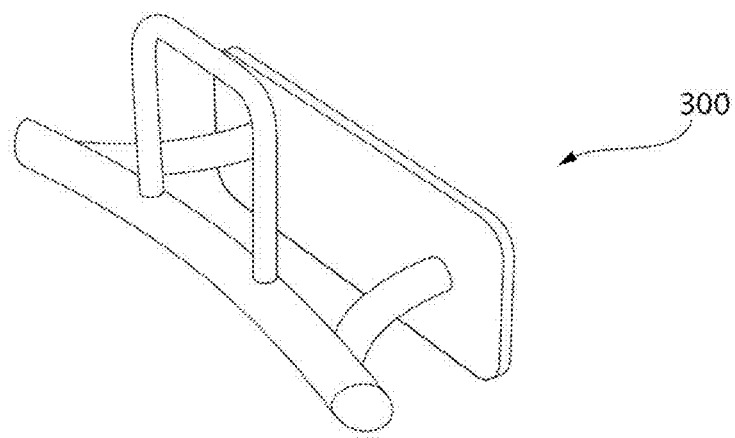
FIG. 4A is a perspective view of a hanger and FIG. 4B is an alternate perspective view according to one embodiment.
Figure 4B:
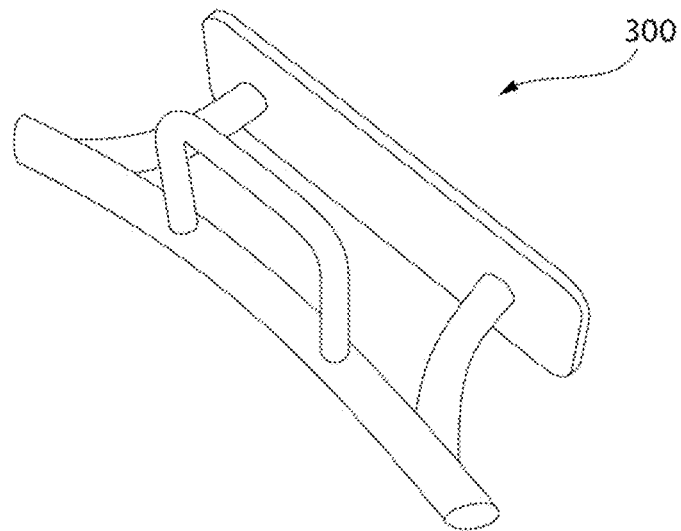
Figure 5A:
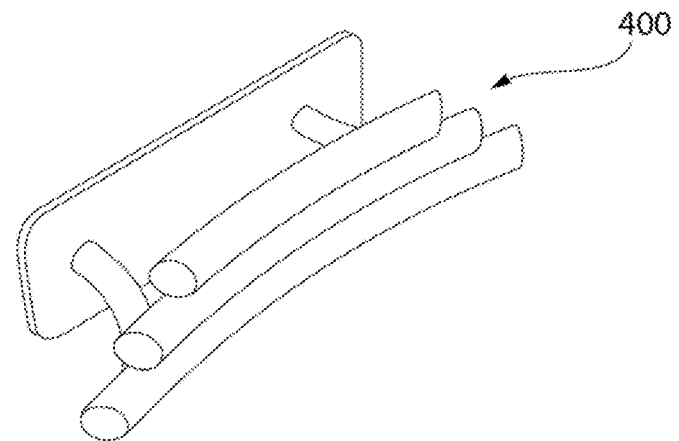
FIG. 5A is a perspective view of a hanger and FIGS. 5B and 5C are alternate perspective views according to one embodiment.
Figure 5B:
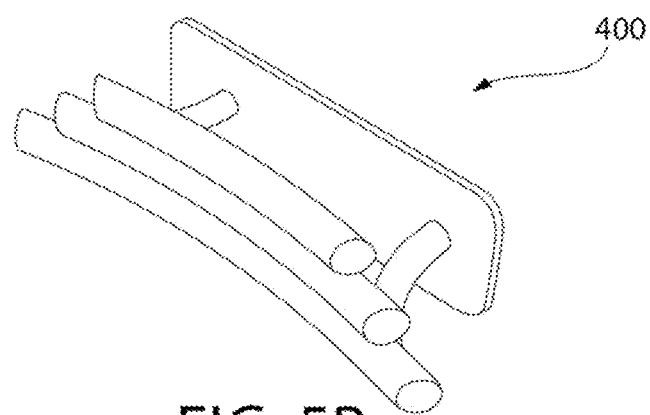
Figure 5C:
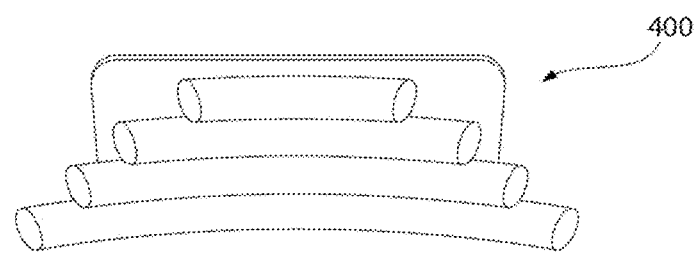

The hanger can be several different geometries without departing from novel features according to several different embodiments. For example, FIGS. 4A and 4B illustrate an embodiment 300 that has an alternate central opening and includes the radius of curvature for mounting the walker. Dimensions according to one exemplary embodiment require the hanger attached to the chair so that the hanger's height from the ground is within the range between 30 inches and 34 inches. Due to the way we the handle is engineered the walker sits fully upright and therefore does not create a tipping issue on a typical chair. Alternate embodiments are shown in the hanger 400 of FIGS. 5A-5C.

Embodiments of the hanger are fastened to the chair using techniques known in the art, such as by wood screws or with a machine screw and t-bolt combination. Various additional safety features can be implemented. In one embodiment, a spring loaded hinged bracket flips the bracket down if the walker is too heavy as a safety feature to avoid the chair becoming unstable. In one embodiment, the hanger flips out when needed then folds into a recess in the chair when not in use. In one embodiment, an ergonomic gripping portion is integrated above the hanger so that the bracket component can also be used as a grip for pulling the chair out while a walker is mounted on the hanger. In one embodiment, weighted front feet are implemented as a safety feature to counteract the hanging walker and increase stability. However, these features are not necessarily required since the chair will not tip with use for a walker. These embodiments may be more suitable for a heavy backpack or heavy purse, such as for chairs in a college campus cafeteria. The hanger can be manufactured from furniture grade materials known in the art such as woods and metals. It is also possible to 3D print the bracket using an ultra-strong material such as carbon fiber and other polymers.

Figure 6A:
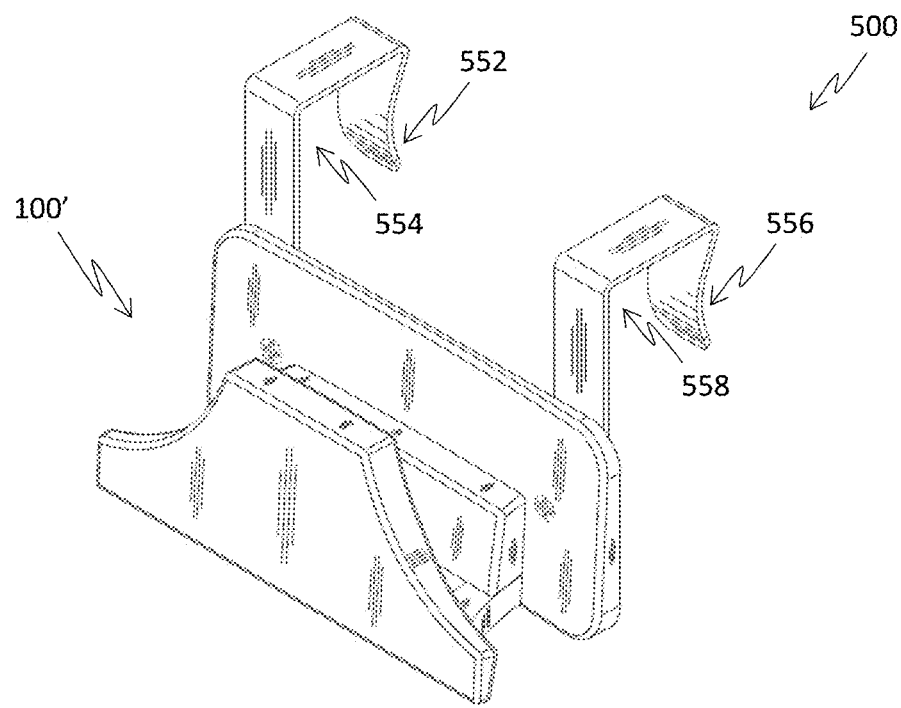
FIG. 6A is a perspective view and FIG. 6B is a side view of a universal hanger according to one embodiment.
Figure 6B:
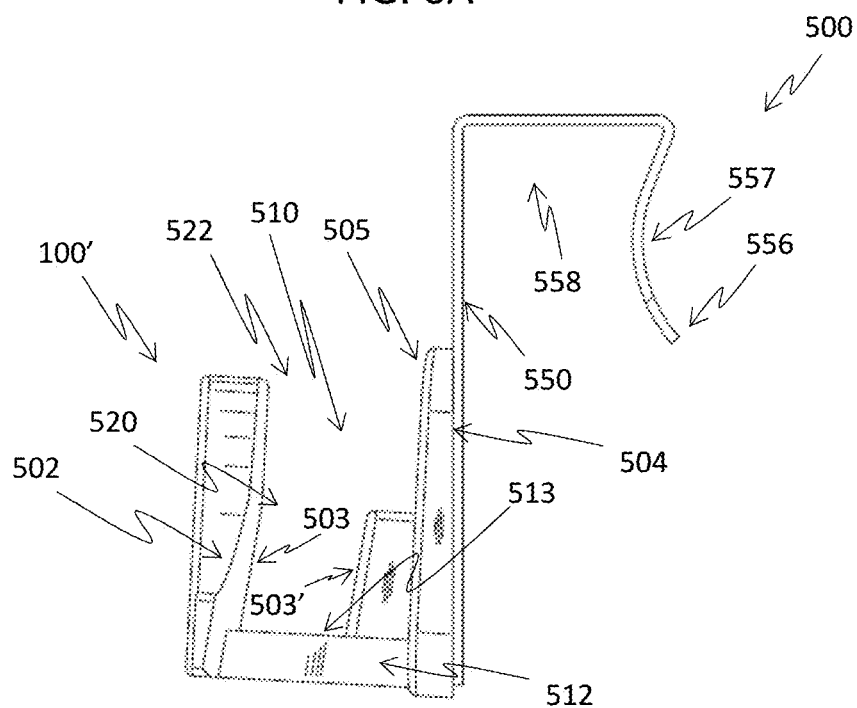
Figure 7A:
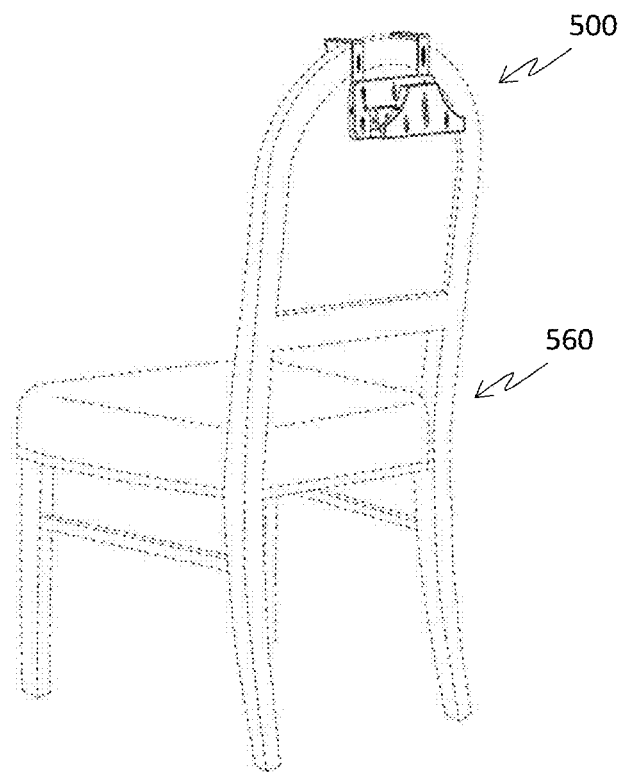
FIGS. 7A and 7B are perspective views of the universal hanger of FIGS. 6A and 6B attached to a chair according to one embodiment.
Figure 7B:
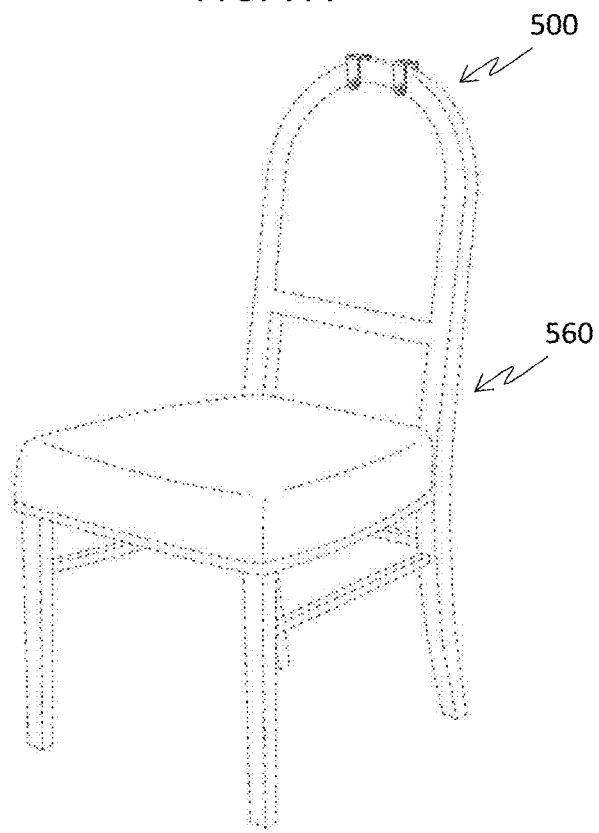

With reference now to FIGS. 6A and 6B, a universal hanger 500 is shown according to one embodiment. The hanger 500 includes a front plate 502, a back plate 504 opposite the front plate 502 and configured for positioning against the back of a chair, and a gap 510 separating the front plate 502 and the back plate 504. The back plate 504 can include one or more attachment mechanism 552, 556 such as a hook for attaching the hanger 500 to the back of a chair (see e.g. FIGS. 7A and 7B, showing the hanger 500 connected to chair 560). The hooks 552, 556 can be separated the same distance from center of the hanger 500 to keep the weight distribution on hanger 500 balanced. Each hook 552, 556 can include an opening 554, 558 sized to fit a range back of chair dimensions, and a pack portion 550 of the hook can be substantially flat. The opening 554, 558 can include a curved portion 557 that creates a tight fit with the back of the chair. The hooks 552, 556 can also have a certain level of flex which allows it to flex over the top structural portion of a chair back then squeeze into a cushioned part of the chair back as it's pushed down, all for providing a universal fit while maintaining a secure position on the chair back. The geometry of the gap 510 is provided by an interior surface 503 of the front plate 502, a front surface 505 of the back plate 504, and a top surface 513 of a plate separator 512. The back plate 504 tapers inward moving from the bottom to the top (a wider profile on bottom gradually tapering to a narrower profile at the top) to compensate for chair pitch. The proper walker hanging angle and secure fit is further provided by the front plate 502 interior surface 503 sidewall and adjacent plate separator 513 interior surface 503' sidewall which are both angled towards the back plate 504, providing a bottom gap opening 520 for wedging the hanger into a stationary and sway-resistant position. The wedge is provided in part by a curved interior surface 503 and 503' sidewalls having a curvature opening away from the back plate 504 and widening their separation (and the gap 510) as the curves move away from center. This provides a tighter wedge-type fit at center, balancing and stabilizing the walker on-center all while making walkers easy to load and retrieve by hand on either side of the hanger. Further, the top surface 513 of the plate separator 512 further provides a 2-step slot for the two conventional categories of walker bar profile sizes and geometries (circular and square), via the smaller gap 520 at the bottom for holding a conventional walker bar profile and the larger gap 522 at the top for holding non-conventional sizes, providing a single hanger 500 that can securely hold multiple sized walkers or some other second object atop a walker mounted below. Advantageously, the portable hanger can for be placed on chairs on a temporary basis, only when needed, and can easily be removed when not needed.

Figure 6C:
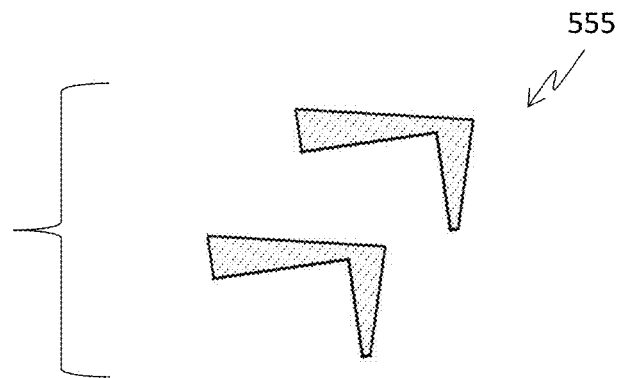
FIG. 6C is a side view of a spacer block set according to one embodiment.
Figure 6D:
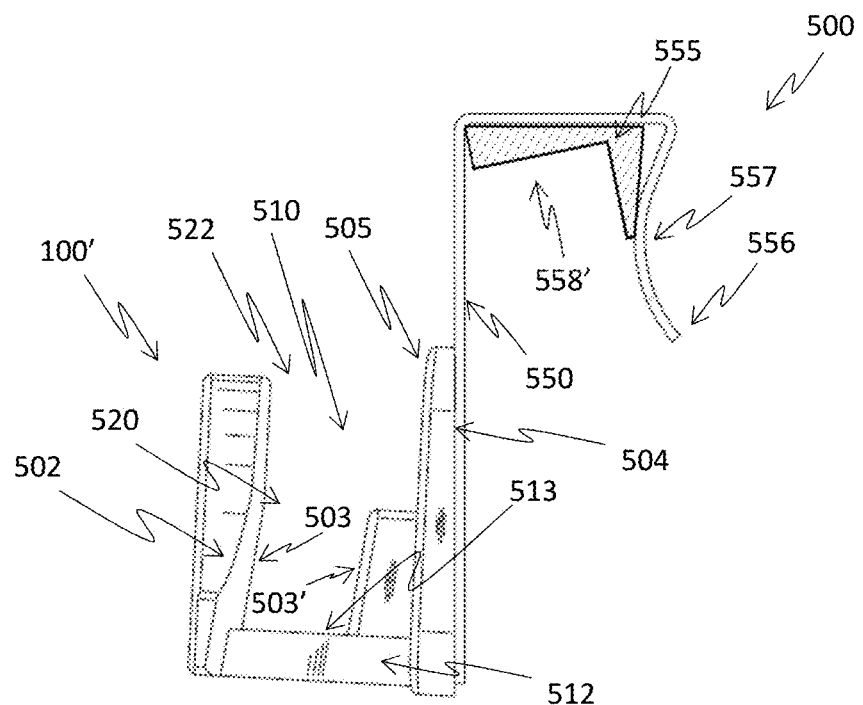
FIG. 6D is a side view of the universal hanger having a spacer block inserted according to one embodiment.

With reference now to FIGS. 6C and 6D, one or more sets of spacer blocks 555 can be provided for use with the universal hanger 500 according to one embodiment. The spacer blocks 555 are utilized to resize the openings 554, 558 to a reduced opening and geometry (e.g. 558' show in FIG. 6D) configured to match the geometry of specific chair models (experimental embodiments shown in FIGS. 9A-9C). Accordingly, the spacer blocks 555 provide additional angles to the openings 554, 558 to interface with the pitch of the corresponding chair back. In one embodiment, the spacer block is made of materials including at least one of a polymer, plastic or rubber. The spacer blocks can utilize one or more of a material, surface layer, and coating conducive to a friction fit with the universal hanger and chair surface materials so that the spacer block does and universal hanger do not shift. In one embodiment, the spacer blocks utilize a layer comprising one or more bumps, treads or protrusions to better grip the chair surface and universal hanger. In one embodiment, the spacer blocks include an adhesive layer or other attachment element known in the art for attachment to the universal hanger and/or chair. In one embodiment, the spacer blocks are 3D printed, with spacer block dimensions provided by the manufacturer via download from a website or app, or other electronic communication means known in the art. This way, the universal hanger can easily be adapted for a custom fit to new chair models on demand.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Figure 8A:
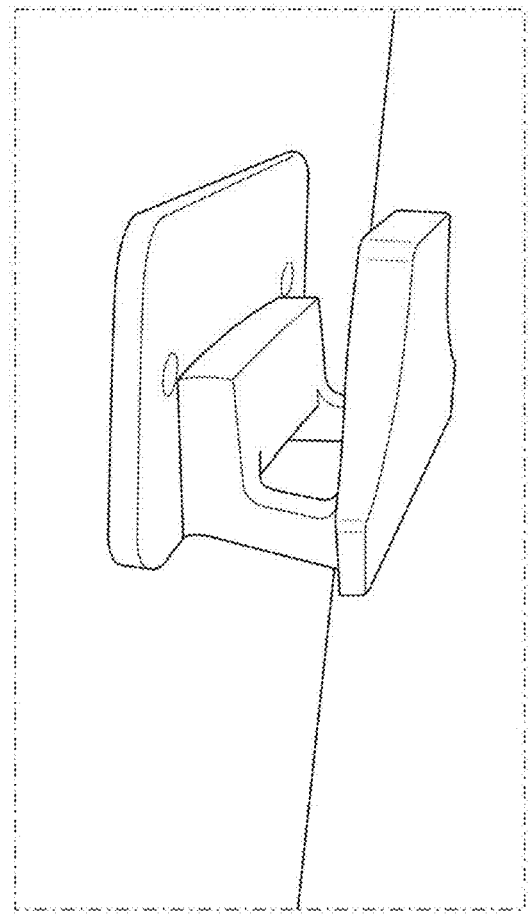
FIG. 8A is an image of a prototype of a hanger attached to an unfinished chair according to one embodiment.
Figure 8B:
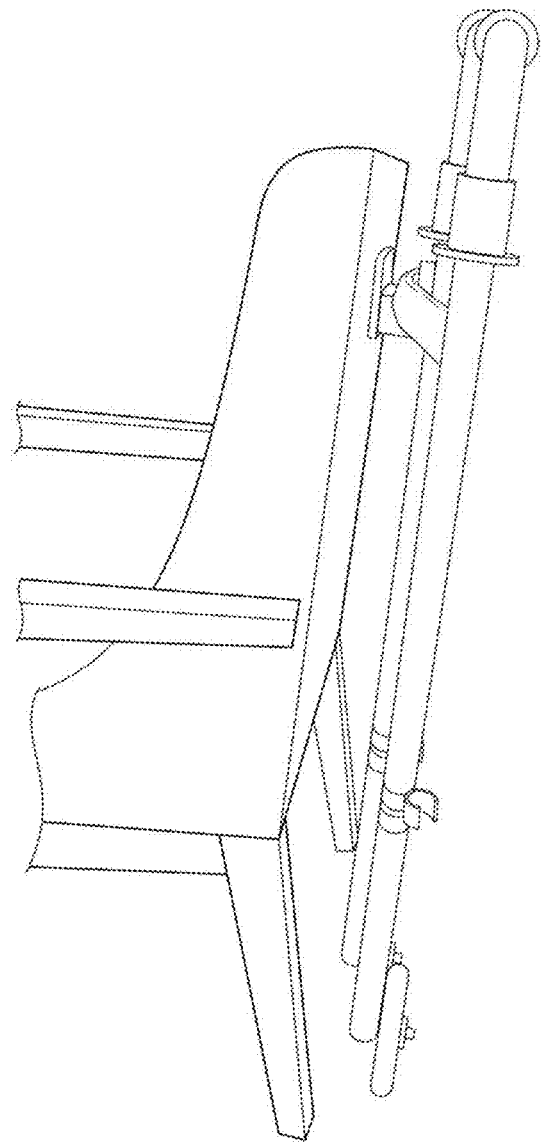
FIGS. 8B-8D are alternate views of the prototype hanger holding a folded walker.
Figure 8C:
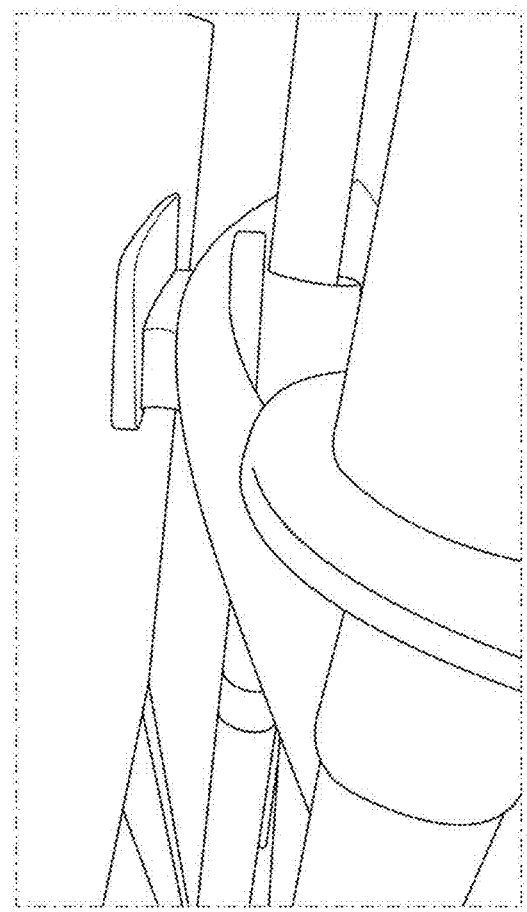
Figure 8D:
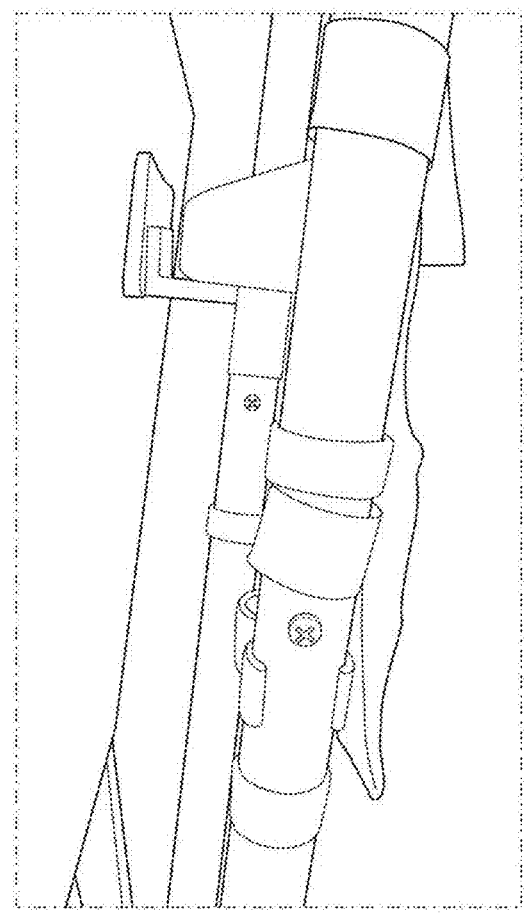

FIGS. 8A-8D show a prototype of the embodiment of FIGS. 1A-1D. FIG. 8A shows the prototype hanger attached to a pitched chair back, while FIGS. 8B-8D show a folded walker resting in the hanger. The hanger configuration allows the walker to fit securely into the hanger, substantially parallel to the back pitch of the chair and suspended from excess movement or sway.

Figure 9A:
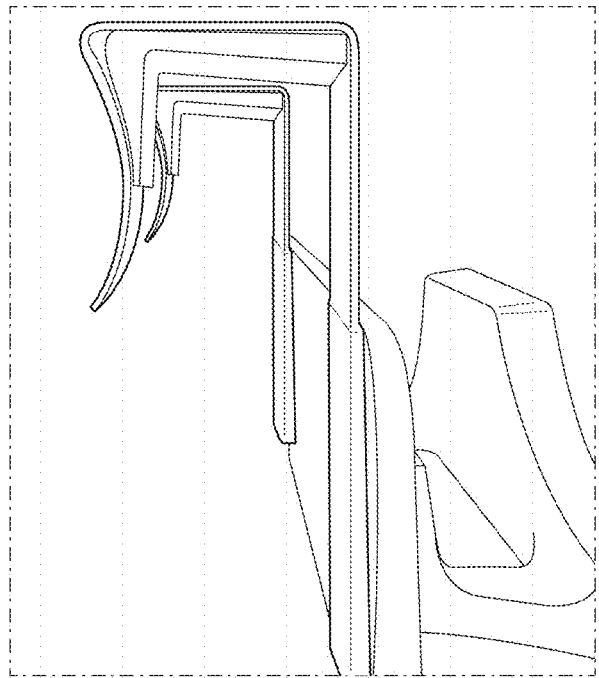
FIG. 9A is a side-perspective view of a prototype universal hanger having a spacer block inserted according to one embodiment.
Figure 9B:
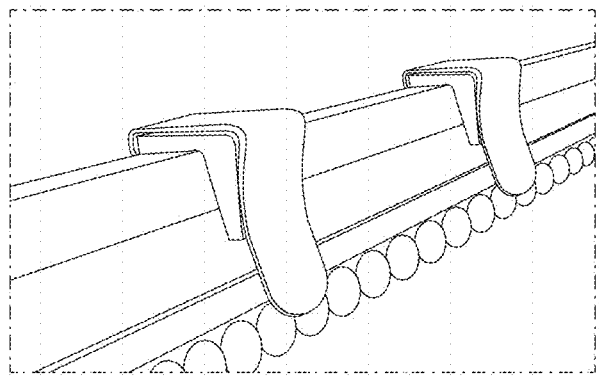
FIGS. 9B and 9C are front and back perspective views of a chair back having a universal hanger attached with spacer blocks inserted according to one embodiment.
Figure 9C:
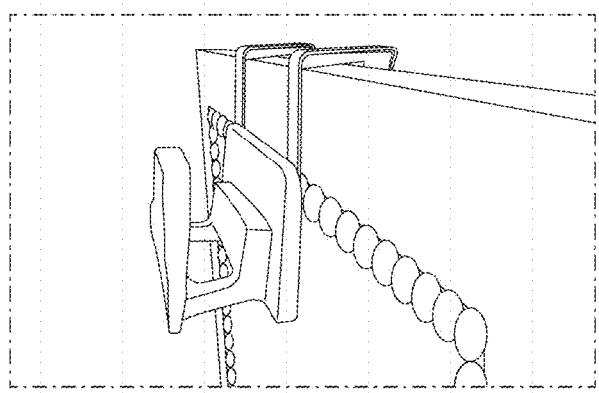

FIGS. 9A-9C show a prototype of a universal hanger with spacer blocks inserted according to one embodiment. The spacer blocks can be inserted into the hook openings (FIG. 9A) so that the opening is reduced to match the geometry of the chair back (FIG. 9B) allowing the universal hanger (FIG. 9C) to lay flush against the chair back (FIG. 9C). This minimizes movement, rocking, lift and tilt of the universal hanger so that it remains secure and stationary during use.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A chair hanger system comprising:
a front plate, a back plate opposing the front plate, a plate separator defining a gap between the front plate and the back plate, and a first and second hook attached to the back plate, the first hook defining a first opening geometry and the second hook defining a second opening geometry; and
a set of spacer blocks comprising a first spacer block configured to insert within the first opening to reduce the first opening geometry and change a first opening pitch, and a second spacer block configured to insert within the second opening to reduce the second opening geometry and change a second opening pitch.

2. The system of claim 1, wherein the gap comprises a lower and an upper gap, wherein an interior surface of the front plate that at least partially defines the lower gap comprises a first concave radius of curvature opening away from the back plate and a sidewall portion angled towards the back plate, and wherein an interior surface of the plate separator that at least partially defines the lower gap comprises has a second concave radius of curvature opening away from the back plate and a sidewall portion angled towards the back plate.

3. The system of claim 2, wherein a gap between the first and second concave radius of curvature increases moving away from center.

4. The hanger of claim 2, wherein the upper gap is larger than the lower gap.

5. The hanger of claim 2, wherein the back plate is tapered inward.

6. The hanger of claim 2, wherein the back plate comprises first and second connection elements, and a vertex of the first and second concave radius of curvature is positioned halfway between first and second connection elements.

7. A chair hanger comprising:
a front plate, a back plate opposing the front plate, a plate separator defining a lower and an upper gap between the front plate and the back plate, and a plurality of hooks attached to the back plate;
wherein an interior surface of the front plate that at least partially defines the lower gap comprises a first concave radius of curvature opening away from the back plate and a sidewall portion angled towards the back plate; and
wherein an interior surface of the plate separator that at least partially defines the lower gap comprises has a second concave radius of curvature opening away from the back plate and a sidewall portion angled towards the back plate.

8. The hanger of claim 7, wherein a gap between the first and second concave radius of curvature increases moving away from center.

9. The hanger of claim 7, wherein the upper gap is larger than the lower gap.

10. The hanger of claim 7, wherein the back plate is tapered inward.

11. The hanger of claim 7, wherein the back plate comprises first and second connection elements, and a vertex of the first and second concave radius of curvature is positioned halfway between first and second connection elements.

* * * * *